US011082792B2

United States Patent
Cardinaux et al.

(10) Patent No.: US 11,082,792 B2
(45) Date of Patent: Aug. 3, 2021

(54) APPARATUS, SYSTEM, METHOD AND COMPUTER PROGRAM FOR DISTRIBUTING ANNOUNCEMENT MESSAGES

(71) Applicant: Sony Corporation, Tokyo (JP)

(72) Inventors: Fabien Cardinaux, Stuttgart (DE); Michael Enenkl, Stuttgart (DE); Marc Ferras Font, Stuttgart (DE); Franck Giron, Stuttgart (DE); Thomas Kemp, Stuttgart (DE); Patrick Putzolu, Stuttgart (DE); Andreas Schwager, Stuttgart (DE); Stefan Uhlich, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/623,780

(22) PCT Filed: Jun. 21, 2018

(86) PCT No.: PCT/EP2018/066592
§ 371 (c)(1),
(2) Date: Dec. 18, 2019

(87) PCT Pub. No.: WO2018/234456
PCT Pub. Date: Dec. 27, 2018

(65) Prior Publication Data
US 2020/0145775 A1 May 7, 2020

(30) Foreign Application Priority Data
Jun. 21, 2017 (EP) ..................... 17177260

(51) Int. Cl.
*H04S 7/00* (2006.01)
*G01C 21/20* (2006.01)
(Continued)

(52) U.S. Cl.
CPC ............ *H04S 7/303* (2013.01); *G01C 21/206* (2013.01); *H04R 1/403* (2013.01); *H04R 3/12* (2013.01);
(Continued)

(58) Field of Classification Search
None
See application file for complete search history.

(56) References Cited

U.S. PATENT DOCUMENTS 6,385,322 B1   5/2002  Mietling
8,374,056 B2   2/2013  Cohen et al.
(Continued)

FOREIGN PATENT DOCUMENTS

DE   102007032272 A1   1/2009
JP   2002-354573 A     12/2002

OTHER PUBLICATIONS

International Search Report and Written Opinion dated Jul. 27, 2018 for PCT/EP2018/066592 filed on Jun. 21, 2018, 10 pages.
(Continued)

*Primary Examiner* — Qin Zhu
(74) *Attorney, Agent, or Firm* — Xsensus, LLP (57) ABSTRACT

An apparatus comprising circuitry configured to generate one or more focused sound sources as virtual loudspeakers of an announcement system.

19 Claims, 10 Drawing Sheets

(51) Int. Cl.
  *H04R 1/40* (2006.01)
  *H04R 3/12* (2006.01)
  *H04R 5/02* (2006.01)
  *H04R 5/04* (2006.01)
  *H04R 27/00* (2006.01)

(52) U.S. Cl.
  CPC ............. *H04R 5/02* (2013.01); *H04R 5/04* (2013.01); *H04R 27/00* (2013.01); *H04S 2400/11* (2013.01); *H04S 2420/13* (2013.01)

(56) References Cited

U.S. PATENT DOCUMENTS

| | | | |
|---|---|---|---|
| 2004/0030491 A1* | 2/2004 | Hull | H04W 4/024 |
| | | | 701/433 |
| 2006/0098830 A1 | 5/2006 | Roeder et al. | |
| 2006/0262935 A1* | 11/2006 | Goose | H04S 3/002 |
| | | | 381/17 |
| 2009/0092263 A1 | 4/2009 | Plocher et al. | |
| 2011/0096941 A1 | 4/2011 | Marzetta et al. | |
| 2011/0103620 A1 | 5/2011 | Strauss et al. | |
| 2014/0221017 A1* | 8/2014 | Jensen | H04W 4/029 |
| | | | 455/456.3 |
| 2015/0030159 A1* | 1/2015 | Ozcan | G01C 21/3629 |
| | | | 381/17 |
| 2016/0037282 A1 | 2/2016 | Giron | |
| 2016/0123745 A1 | 5/2016 | Cotier et al. | |
| 2017/0013385 A1 | 1/2017 | Vautin et al. | |
| 2018/0324532 A1* | 11/2018 | Kukla | G01C 21/3629 |
| 2018/0359591 A1* | 12/2018 | Bygrave | H04S 3/008 |
| 2018/0367937 A1* | 12/2018 | Asada | H04R 5/033 |

OTHER PUBLICATIONS

Mori, J., et al., "Acoustic design of municipal public address systems using computer modeling and 3-dimensional auralization technique," Forum Acusticum 2014, Krakow, Sep. 7-12, 2014, 3 pages (See Abstract).

* cited by examiner

Fig. 7

APPARATUS, SYSTEM, METHOD AND COMPUTER PROGRAM FOR DISTRIBUTING ANNOUNCEMENT MESSAGES

CROSS-REFERENCE TO RELATED APPLICATIONS

The present application is based on PCT filing PCT/EP2018/066592, filed Jun. 21, 2018, which claims priority to EP 17177260.1, filed Jun. 21, 2017, the entire contents of each are incorporated herein by reference.

TECHNICAL FIELD

The present disclosure generally pertains to the field of announcement systems, in particular to apparatus, systems, methods and computer programs for distributing announcement messages.

TECHNICAL BACKGROUND

Public announcement systems, which are also called public address systems (PA system), typically comprise one or more components such as microphones, amplifiers and loudspeakers, and they allow the transmission of acoustic signals to an audience. Such systems are used in public areas and events to announce speech, alerts and important information.

Known public announcement systems typically consist of multiple speakers which are directed to an audience and which synchronously transmit the same audio signal. Public announcement systems with many speakers are widely used to make announcements in public, institutional and commercial buildings and locations, such as schools, stadiums and large passenger vessels and aircrafts.

SUMMARY

According to a first aspect, the disclosure provides an apparatus comprising circuitry configured to generate one or more focused sound sources as virtual loudspeakers of an announcement system.

According to a further aspect, the disclosure provides a method comprising generating one or more focused sound sources as virtual loudspeakers of an announcement system.

According to a further aspect, the disclosure provides a computer program comprising instructions, the instructions when executed on a processor, causing the processor to generate one or more focused sound sources as virtual loudspeakers of an announcement system.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
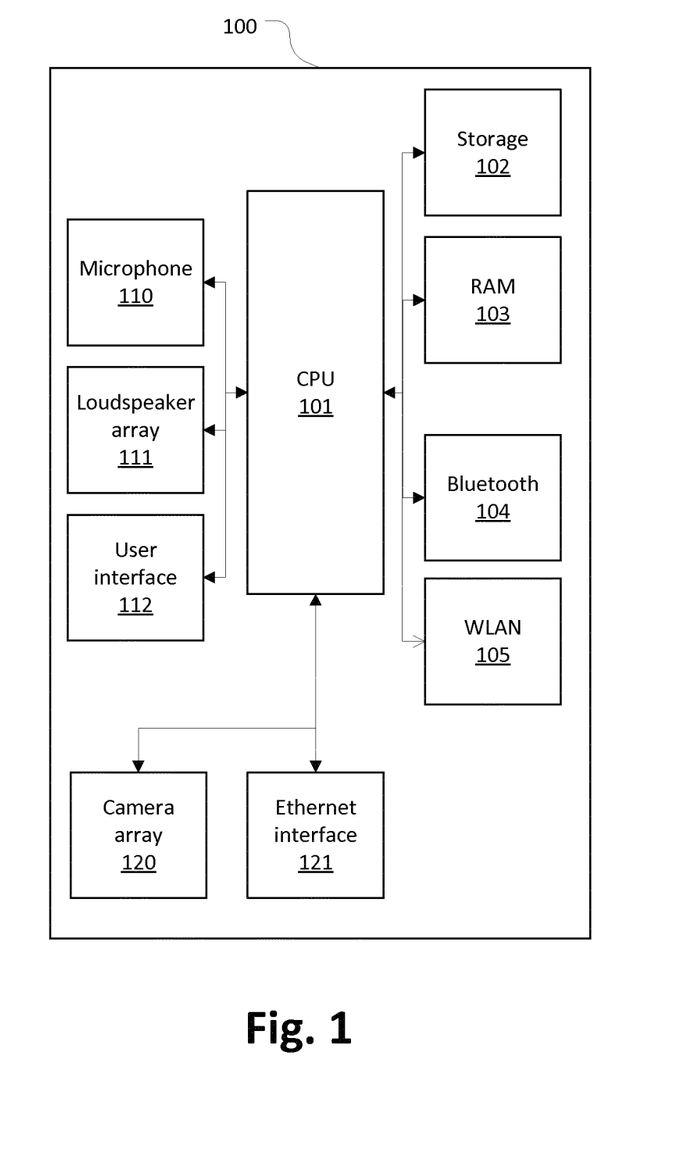
FIG. 1 schematically describes an embodiment of an electronic system that can act as public announcement system.

Before a detailed description of the embodiments under reference of FIG. 1 is given, some general explanations are made.

In the embodiments an apparatus is disclosed comprising circuitry configured to generate one or more focused sound sources as virtual loudspeakers of an announcement system.

The announcement system may, for example, be a public announcement system. For example, the announcement system may be an announcement system for a museum, a railway station, an airport, a passenger hall, or the like. Even though the term "public" as used here also relates to spaces and/or rooms that are open to the public, such as a museum, a train station, an airport building, a passenger hall, a garden, or a park, the term "public" should not be considered as being restricted to spaces that are accessible to everybody. A public announcement system may also be installed in a school to address teachers and pupils, in a company or firm to address the employees of the company or firm, or the like.

Circuitry may include a processor, a memory (RAM, ROM or the like), a storage, input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, it may include sensors for sensing still image or video image data (image sensor, camera sensor, video sensor, etc.), for sensing environmental parameters (e.g. radar, humidity, light, temperature), etc.

A focused sound source may, for example, be a sound field that gives the impression that an audio point source is located inside a predefined space or listening room (e.g. a museum, hall, park, etc.). Using focused sound sources may, for example, allow generating audio messages that are spatially confined. In particular, creating focused sound sources can be seen as a form of creating virtual loudspeakers.

The apparatus may comprise one or more video cameras that are distributed over a predefined space. For example, the video cameras may be comprised in a camera array that monitors a public space such as a passenger hall.

The circuitry may be configured to use Wavefield synthesis and/or monopole synthesis techniques to generate focused sound sources. Wavefield synthesis and/or monopole synthesis techniques may be used to generate a sound field that gives the impression that an audio point source is located inside a predefined space or listening room (e.g. a museum, hall, etc.). Such an impression can, for example, be achieved by using a Wavefield synthesis or monopole synthesis approach that drives a loudspeaker array such that the impression of a focused sound source is generated.

The circuitry may be configured to generate a focused sound source that is located at a predefined position of a predefined space. For example, the circuitry may be configured to generate a focused sound source that is located at an exit door, a passenger hall, or at an emergency exit of a building.

The circuitry may be configured to generate one or more audio messages at the focused sound sources. For example, audio messages (PA messages) of a public announcement system may be generated using the focused sound sources.

A focused sound source may, for example, be a sound field that gives the impression that an audio point source is located at a specific position in a predefined space. For example, the circuitry may be configured to generate one or more focused sound sources that allow generating audio messages that are spatially confined.

The circuitry may be configured to generate multiple focused sound sources that are combined to form arbitrarily shaped audio areas.

Still further, the circuitry may be configured to generate a focused sound source that directs a person to a specific position of a predefined space. For example, the circuitry may be configured to generate a focused sound source that directs a passenger to an exit of a passenger hall.

The circuitry may be configured to generate a focused sound source that is located close to an exit door.

Still further, the circuitry may be configured to generate person-individual focused sound sources. A public announcement system which uses focused sound sources as a form of creating virtual loudspeakers may be able to simultaneously convey multiple public announcement messages to different areas of interest.

The circuitry may be configured to apply image recognition techniques to images obtained by a camera array to obtain the positions of persons in a predefined space. Any known image recognition technique, such as pattern recognition, machine learning, or the like, may be applied for this purpose.

According to some embodiments, the circuitry is configured to calculate a trajectory that represents the path that a person should take to arrive at a predefined destination. For example, based on the position of a person in a predefined space (e.g. a passenger hall) and based on the predefined position of a destination (e.g. an exit door) in the predefined space, a public announcement system may calculate a trajectory representing the path that the person should take to arrive at the destination. On this trajectory, the public announcement system may place a focused sound source that is located close to a person. This focused sound source may generate an audio message such as "Please find the exit here".

Still further, the circuitry may be configured to adapt the loudness of an audio message so that the audio message is primarily audible for a specific person who is located close to a focused sound source, but less audible, or substantially inaudible, for other persons who are located farther away from the focused sound source. It might also be possible to use signals of different character (e.g., male vs. female voice) to have a better separation of messages. The system could take this into account when generating the audio message for a specific person.

The circuitry may be configured to generate for each of a plurality of persons an individually focused sound source.

With such individual focused sound sources, a public announcement system may guide persons individually to a specific destination.

Still further, the circuitry may be configured to generate a focused sound source that is moving. For example, by applying image recognition techniques to images obtained by a camera array, a public announcement system may obtain the position of a person in a predefined space. Based on this position of the person in the predefined space and based on the predefined position of a destination in the predefined space, the public announcement system may calculate a trajectory that represents the path that a person should take to arrive from his position at the destination. On this trajectory, the public announcement system may place a focused sound source that is located close to the person. This focused sound source may generate an audio message "Please find the exit here". The person will thus move into the direction of the focused sound source, i.e. in the direction where it perceives the audio message emerging from. This process of placing the focused sound source in accordance with the position of a person may be repeated until the person arrives at the destination.

Also, the circuitry may be configured to generate a focused sound source whose position is changed dynamically following a predefined trajectory in a smooth way.

The circuitry may be configured to generate multiple focused sound sources for emitting multiple audio messages at the same time. For example, by applying image recognition techniques to the images obtained by a camera array, a public announcement system may obtain the position of persons in a predefined space. By image matching techniques, the public announcement system may further determine the identity of the persons located in the predefined space. Based on the identity information the public announcement system may query a data base that stores check-in information concerning the persons in order to obtain the respective destinations to which the persons should go to (e.g. gate A1 for a first passenger and gate B2 for a second passenger located in a passenger hall of an airport). Close to each position of each person, the public announcement system may place a focused sound source. Each focused sound source may generate an audio message that directs the respective person to his destination. Persons can thus receive individual messages that direct them to their respective destinations.

The circuitry may be configured to generate multiple audio messages at the same time that are used to address a person or a group of persons simultaneously with different messages. With a public announcement system that allows conveying several audio messages at the same time, the messages can be individualized for a person or a group of persons.

The circuitry may be configured to generate one or more audio messages, each audio message depending on a location of a person, a destination of the person, and/or person-specific information of the person. For example, a public announcement system may guide a person in an airport such that he can easily transfer from one gate to another, if the public announcement system knows what his connecting flight is.

The embodiments also disclose a method comprising generating one or more focused sound sources as virtual loudspeakers of an announcement system. The method may comprise any of the processes and/or operations that are described above or in the detailed description of the embodiments below.

The embodiments also disclose a computer program comprising instructions, the instructions when executed on a processor, causing the processor to generate one or more focused sound sources as virtual loudspeakers of an announcement system. The computer program may implement any of the processes and/or operations that are described above or in the detailed description of the embodiments below.

Public Announcement System

FIG. 1 schematically describes an embodiment of an electronic system that can act as a public announcement system. The electronic system 100 comprises a CPU 101 as processor. The electronic device 100 further comprises a microphone 110, a loudspeaker array 111 and a camera array 120 that are connected to the processor 101. Microphone 110 can for example be used to generate audio messages that are distributed via the public announcement system. Loudspeaker array 111 consists of one or more loudspeakers that are distributed over the predefined space. Camera array 120 consists of one or more video cameras that are distributed over the predefined space. The electronic device 100 further comprises a user interface 112 that is connected to the processor 101. This user interface 112 acts as a man-machine interface and enables a dialogue between an administrator and the electronic system. For example, an administrator may make configurations to the system using this user interface 112. The electronic system 100 further comprises an Ethernet interface 121, a Bluetooth interface 104, and a WLAN interface 105. These units 104, 105 act as I/O interfaces for data communication with external devices. For example, additional loudspeakers, microphones, and video cameras with Ethernet, WLAN or Bluetooth connection may be coupled to the processor 101 via these interfaces 121, 104, and 105.

The electronic device 100 further comprises a data storage 102 and a data memory 103 (here a RAM). The data memory 103 is arranged to temporarily store or cache data or computer instructions for processing by the processor 101. The data storage 102 is arranged as a long term storage, e.g., for recording sensor data obtained from the microphone 110 and the camera array 120. The data storage 102 may also store audio data that represents audio messages which the public announcement system may transport to persons moving in the predefined space.

It should be noted that the description above is only an example configuration. Alternative configurations may be implemented with additional or other sensors, storage devices, interfaces, or the like.

Focused Sound Source

Figure 2:
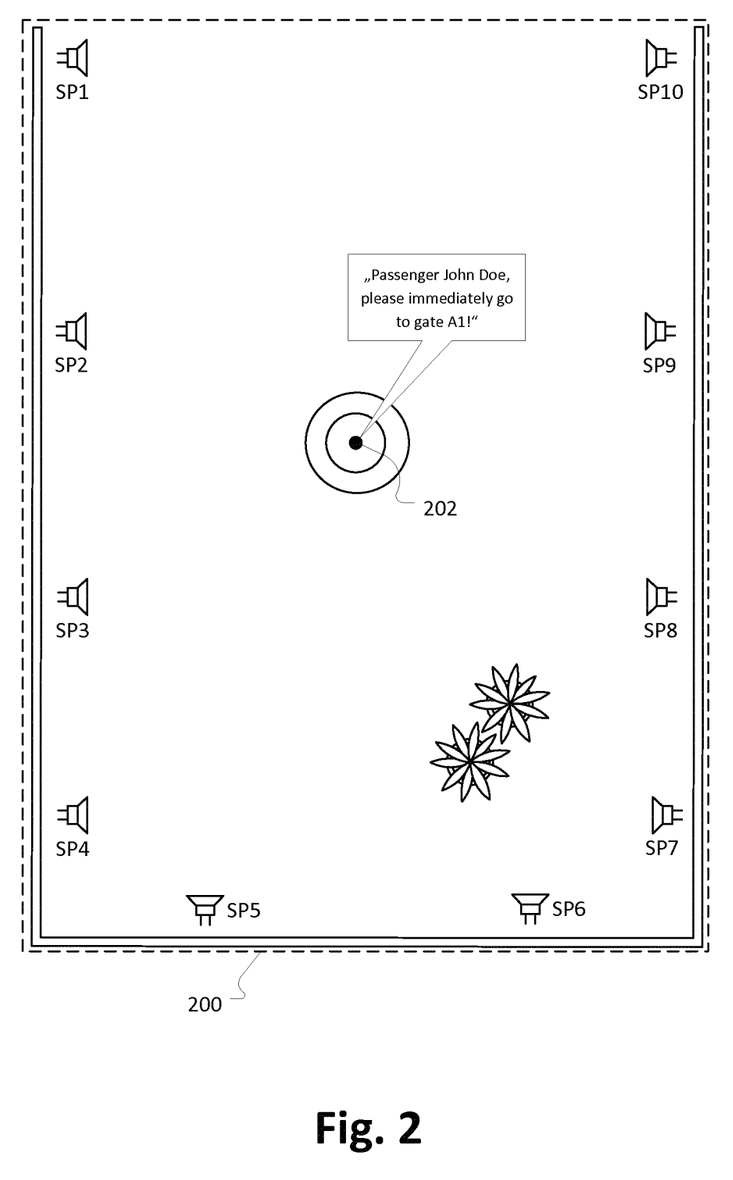
FIG. 2 schematically depicts a public announcement system that generates a focused sound source.

FIG. 2 schematically depicts a public announcement system that generates a focused sound source. Here, the public space is a passenger hall 200 within an airport building. A loudspeaker array of the public announcement system comprises loudspeakers SP1 to SP10 that are arranged at the walls of the passenger hall 200. Using techniques such as Wavefield synthesis, the public announcement system generates a focused sound source 202 that is located in the middle of the passenger hall 200.

The focused sound source 202 generates an audio message "Passenger John Doe, please immediately go to gate A1!" that is distributed in hall 200.

By focused sound source, it is referred here to a sound field that gives the impression that an audio point source is located inside the listening room (e.g., museum, hall, etc.). Such an impression can be achieved by using a Wavefield synthesis approach that drives the surrounding loudspeakers SP1 to SP10 such that the impression of a focused sound source is generated (see FIG. 7 and corresponding description below). Using focused sound sources for public announcement systems as described above with regard to FIG. 2 allows generating audio messages that are spatially confined. In particular, creating focused sound sources can be seen as a form of creating virtual loudspeakers.

In FIG. 2 there is displayed only one focused sound source 202. However, in other embodiments, several focused sound sources are combined to form arbitrarily shaped audio areas.

Focused Sound Source that Directs Passengers to an Exit Door

Figure 3:
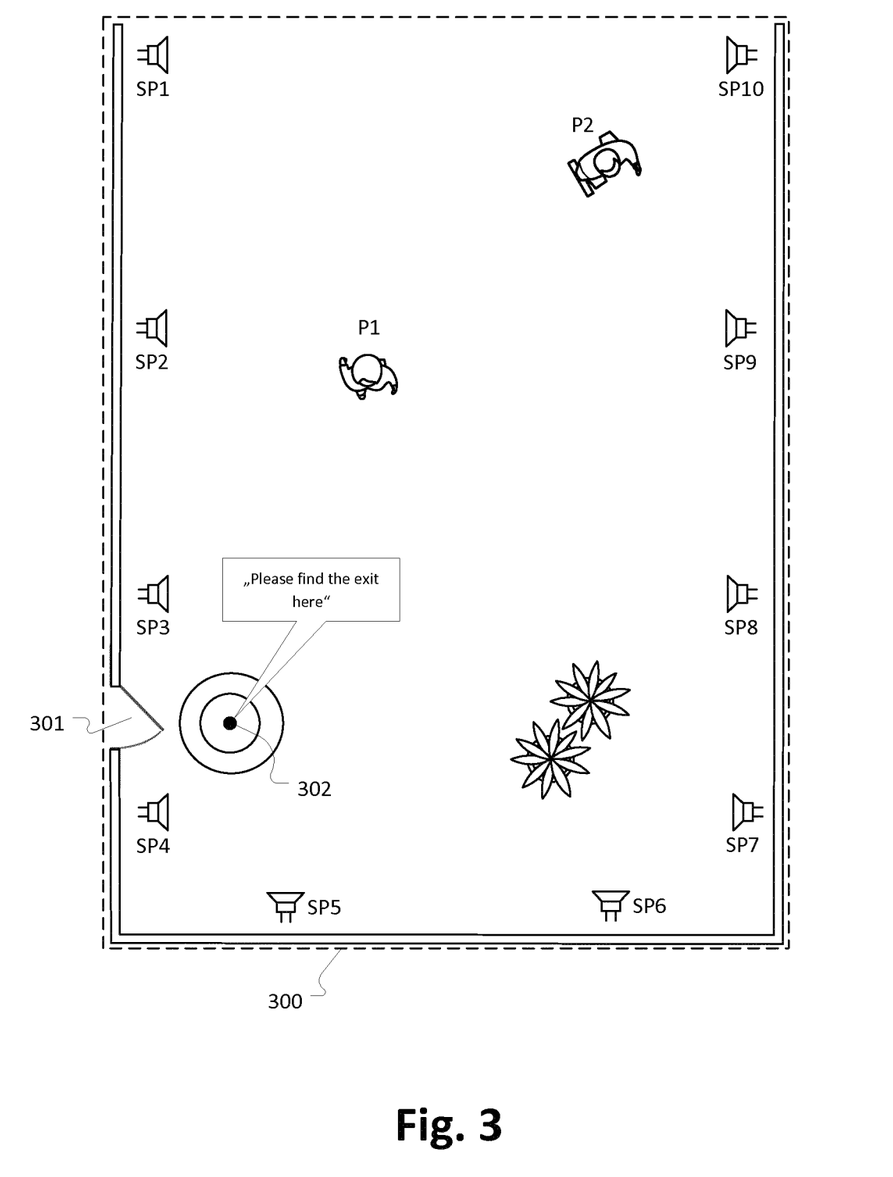
FIG. 3 schematically depicts a public announcement system that generates a focused sound source that directs passengers to an exit door.

FIG. 3 schematically depicts a public announcement system that generates a focused sound source that directs passengers P1 and P2 to an exit door 301 of a passenger hall 300. As in the embodiment of FIG. 2 a loudspeaker array of the public announcement system comprises loudspeakers SP1 to SP10 that are arranged at the walls of the passenger hall 300. Using techniques such as Wavefield synthesis, the public announcement system generates a focused sound source 302 that is located close to the exit door 301 of passenger hall 300. The focused sound source 302 generates an audio message "Please find the exit here" that is distributed within the passenger hall 300. The focused sound source 302 gives the impression that an audio point source is located in front of the exit door 301. Passengers P1 and P2 thus can move into the direction of the focused sound source 302, i.e. in the direction where they perceive the audio message emerging from and they will automatically arrive at the exit door 301. That is, the audio message that is emitted by focused sound source 302 leads passengers P1 and P2 to exit door 301.

That is, according to the embodiment of FIG. 3, as the listener gets the impression of a source inside the room/hall, location information can be attached to an audio message without having the need to install a physical loudspeaker at the desired location (which might be impractical or even impossible, e.g., in the case of a moving source).

Passenger-Individual Sound Sources

Figure 4A:
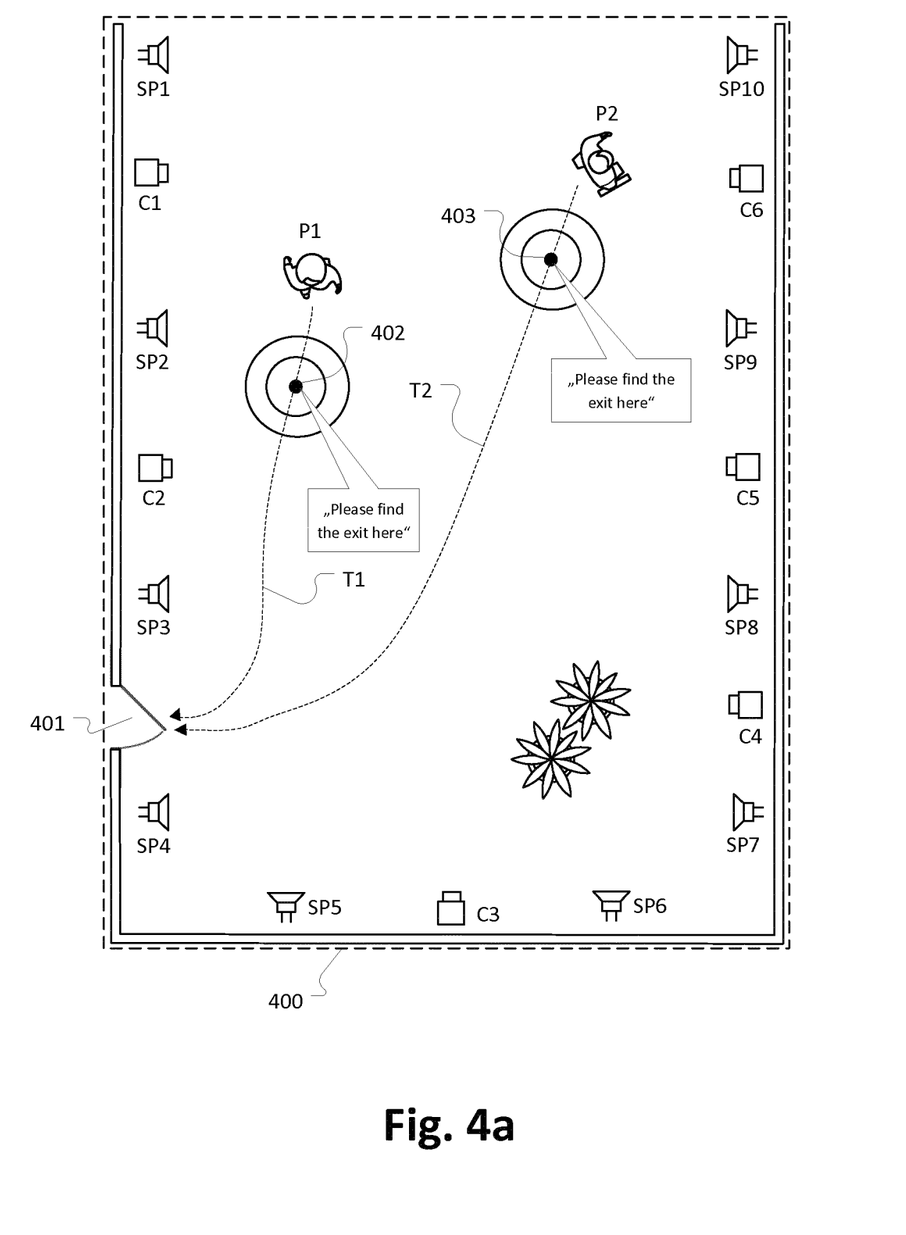
FIG. 4a schematically depicts a public announcement system that generates passenger-individual sound sources.

FIG. 4a schematically depicts a public announcement system that generates passenger-individual sound sources. As in the embodiments of FIGS. 1 and 2 a loudspeaker array of the public announcement system comprises loudspeakers SP1 to SP10 that are arranged at the walls of a passenger hall 400. In addition, the public announcement system comprises a camera array that comprises cameras C1 to C6 that are arranged at the walls of passenger hall 400. The cameras C1 to C6 produce images of the passenger hall 400. By applying image recognition techniques to the images obtained by cameras C1 to C6, the public announcement system obtains the position of passengers P1 and P2 in passenger hall 400. Based on the position of passenger P1 in passenger hall 400 and based on the predefined position of exit door 401 in passenger hall 400, the public announcement system calculates trajectory T1 that represents the path that passenger P1 should take to arrive at exit door 401. On this trajectory T1, the public announcement system places a focused sound source 402 that is located close to passenger P1. This focused sound source 402 generates an audio message "Please find the exit here". As the focused sound source 402 is located close to passenger P1, the loudness of the audio message can be adapted so that the audio message is primarily and clearly audible for passenger P1, but not prominent for passenger P2 who is located far away from the focused sound source 402. Similarly, based on the position of passenger P2 in passenger hall 400 and based on the predefined position of exit door 401 in passenger hall 400, the public announcement system calculates trajectory T2 that represents the path that passenger P2 should take to arrive at exit door 401. On this trajectory T2, the public announcement system places a focused sound source 403 that is located close to passenger P2. This focused sound source 403 generates an audio message "Please find the exit here". As the focused sound source 403 is located close to passenger P2, the loudness of the audio message can be adapted so that the audio message is primarily and clearly audible for passenger P2, but not prominent for passenger P1 who is located far away from the focused sound source 403.

Passengers P1 and P2 thus can move into the direction of the focused sound sources 402 and 403, respectively, i.e. in the direction where they perceive the audio message emerging from and they will automatically arrive at the exit door 401. That is, the audio message that is emitted by focused sound sources 402 and 403 leads passengers P1 and P2 to the exit door 401. As the audio message is emitted for each passenger P1, P2 by a person sound source 402, 403, each passenger is individually guided to exit door 401 on an optimized path.

Figure 4B:
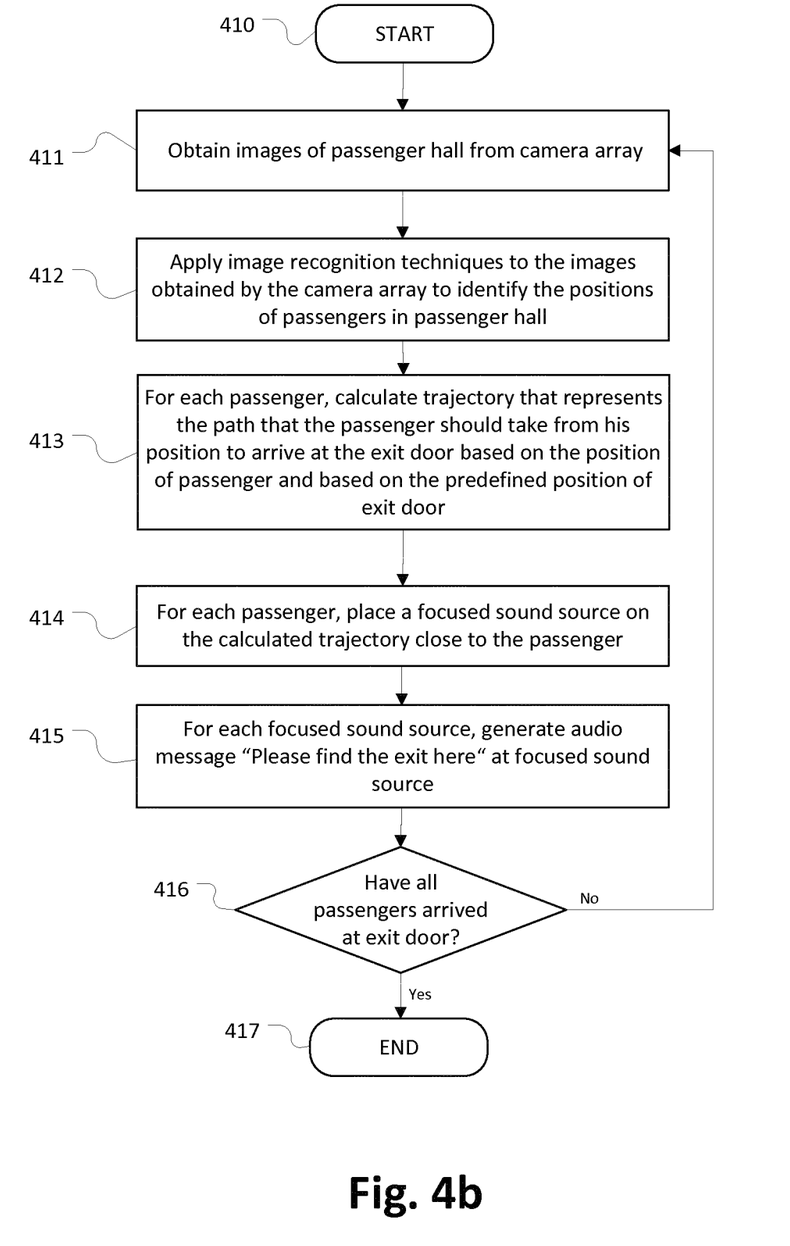
FIG. 4b schematically depicts a process that generates passenger-individual sound sources.

FIG. 4b schematically depicts a process that generates passenger-individual sound sources. At 410, the process starts. At 411, images of the passenger hall are obtained from a camera array. At 412, image recognition techniques are applied to the images obtained by the camera array to identify the positions of passengers in the passenger hall. At 413, for each passenger, a trajectory is calculated that represents the path that a passenger should take from his position to arrive at the exit door based on his position and based on the predefined position of the exit door. At 414, for each passenger, a focused sound source is placed on the calculated trajectory close to the passenger. At 415, for each focused sound source, an audio message "Please find the exit here" is generated at the focused sound source. At 416 it is tested if all passengers have arrived at the exit door. If yes, at 417, the process ends. If no, operations 411 to 416 are repeated.

Moving Sound Sources

Figure 5A:
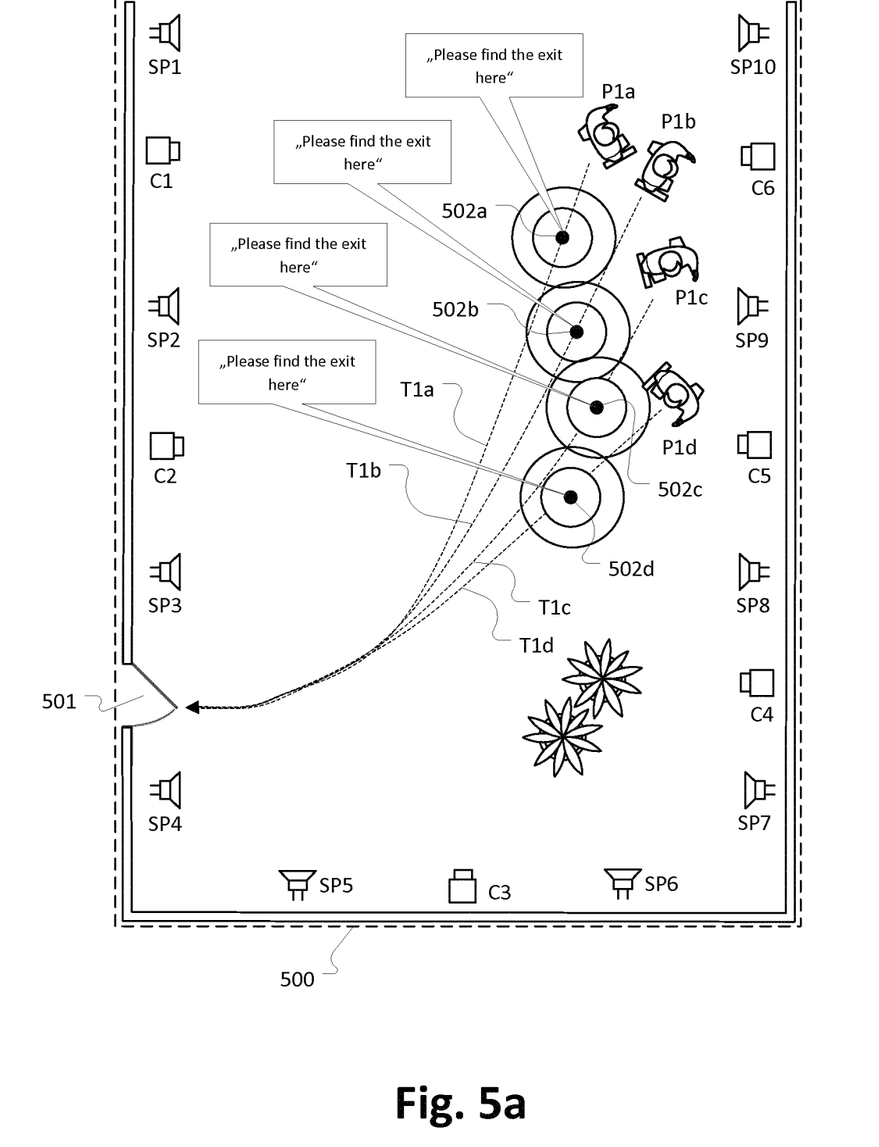
FIG. 5a schematically depicts a public announcement system that generates a moving sound source.

FIG. 5a schematically depicts a public announcement system that generates a moving sound source. As in the embodiment of FIG. 4a the public announcement system comprises a loudspeaker array comprising loudspeakers SP1 to SP10 that are arranged at the walls of a passenger hall 500. In addition, the public announcement system comprises a camera array that comprises cameras C1 to C6 that are arranged at the walls of passenger hall 500. The cameras C1 to C6 produce images of the passenger hall 500. By applying image recognition techniques to the images obtained by cameras C1 to C6, the public announcement system obtains the position P1$a$ of a passenger P1 at position P1$a$ in passenger hall 500. Based on the position P1$a$ of passenger P1 in passenger hall 500 and based on the predefined position of exit door 501 in passenger hall 500, the public announcement system calculates a trajectory T1$a$ that represents the path that passenger P1 should take to arrive from location P1$a$ at exit door 501. On this trajectory T1$a$, the public announcement system places a focused sound source 502$a$ that is located close to passenger P1 at position P1$a$. This focused sound source 502$a$ generates an audio message "Please find the exit here". As the focused sound source 502$a$ is located close to passenger P1 at position P1$a$, the loudness of the audio message can be adapted in such a manner that the audio message is primarily and clearly audible for passenger P1, but not prominent for other passengers (not shown in FIG. 5a) located in the passenger hall 500. Passenger P1 will thus move into the direction of the focused sound source 502$a$, i.e. in the direction where he perceives the audio message emerging from. By applying image recognition techniques to the images obtained by cameras C1 to C6, the public announcement system obtains a next position P1$b$ of passenger P1 at position P1$b$ in passenger hall 500. Based on position P1$b$ of passenger P1 in passenger hall 500 and based on the predefined position of exit door 501 in passenger hall 500, the public announcement system calculates a trajectory T1$b$ that represents the path that passenger P1 should take to arrive from location P1$b$ at exit door 501. On this trajectory T1$b$, the public announcement system places a focused sound source 502$b$ that is located close to passenger P1 at position P1$b$. This focused sound source 502$b$ generates an audio message "Please find the exit here". Passenger P1 will thus move into the direction of the focused sound source 502$b$, i.e. in the direction where he perceives the audio message emerging from. Again, by applying image recognition techniques to the images obtained by cameras C1 to C6, the public announcement system obtains a next position P1$c$ of passenger P1 at position P1$c$ in passenger hall 500. Based on position P1$c$ of passenger P1 in passenger hall 500 and based on the predefined position of exit door 501 in passenger hall 500, the public announcement system calculates a trajectory T1$c$ that represents the path that passenger P1 should take to arrive from location P1$c$ at exit door 501. On this trajectory T1$c$, the public announcement system places a focused sound source 502$c$ that is located close to passenger P1 at position P1$c$. This focused sound source 502$c$ generates an audio message "Please find the exit here". Passenger P1 will thus move into the direction of the focused sound source 502$c$, i.e. in the direction where he perceives the audio message emerging from. Again, by applying image recognition techniques to the images obtained by cameras C1 to C6, the public announcement system obtains a next position P1$d$ of passenger P1 at position P1$d$ in passenger hall 500. Based on position P1$d$ of passenger P1 in passenger hall 500 and based on the predefined position of exit door 501 in passenger hall 500, the public announcement system calculates a trajectory T1$d$ that represents the path that passenger P1 should take to arrive from location P1$d$ at exit door 501. On this trajectory T1$d$, the public announcement system places a focused sound source 502$d$ that is located close to passenger P1 at position P1$d$. This focused sound source 502$d$ generates an audio message "Please find the exit here". Passenger P1 will thus move into the direction of the focused sound source 502$d$, i.e. in the direction where he perceives the audio message emerging from. This process of moving the focused sound source in accordance with the position of passenger P1 is repeated, until passenger P1 arrives at the exit door 501.

That is, by the embodiment of FIG. 5a, the position of a focused sound source can be changed dynamically following an arbitrarily trajectory in a smooth way.

Figure 5B:
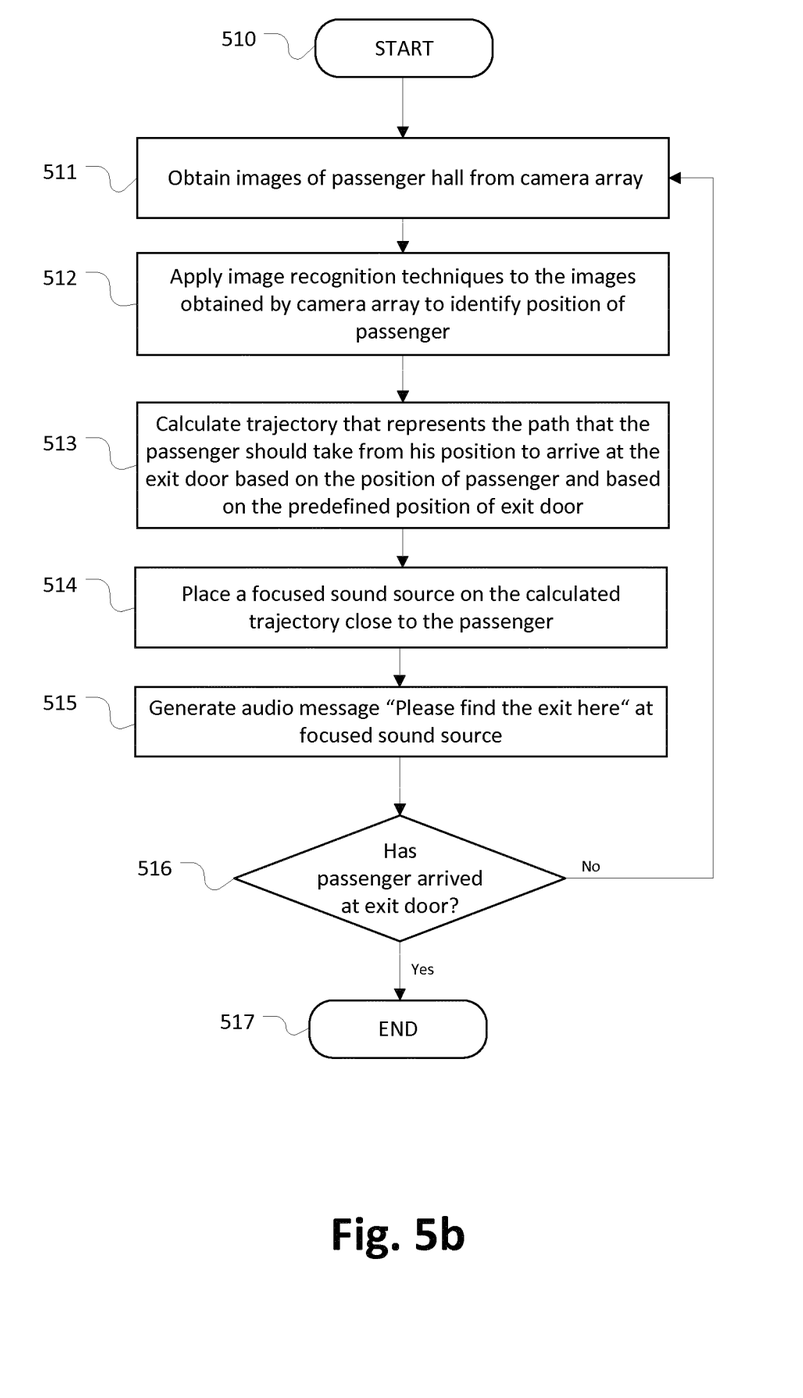
FIG. 5b schematically depicts a process that generates a moving sound source.

FIG. 5b schematically depicts a process that generates a moving sound source. At 510, the process starts. At 511, images of the passenger hall are obtained from a camera array. At 512, image recognition techniques are applied to the images obtained by the camera array to identify the position of a passenger. At 513, a trajectory is calculated that represents the path that the passenger should take from his position to arrive at the exit door based on the position of the passenger and based on the predefined position of the exit door. At 514, a focused sound source is placed on the calculated trajectory close to the passenger. At 515, an audio message "Please find the exit here" is generated at the focused sound source. At 516, it is tested if the passenger has arrived at the exit door. If yes, at 517, the process ends. If not, the process repeats operations 511 to 516.

Multiple Audio Messages at the Same Time

Figure 6A:
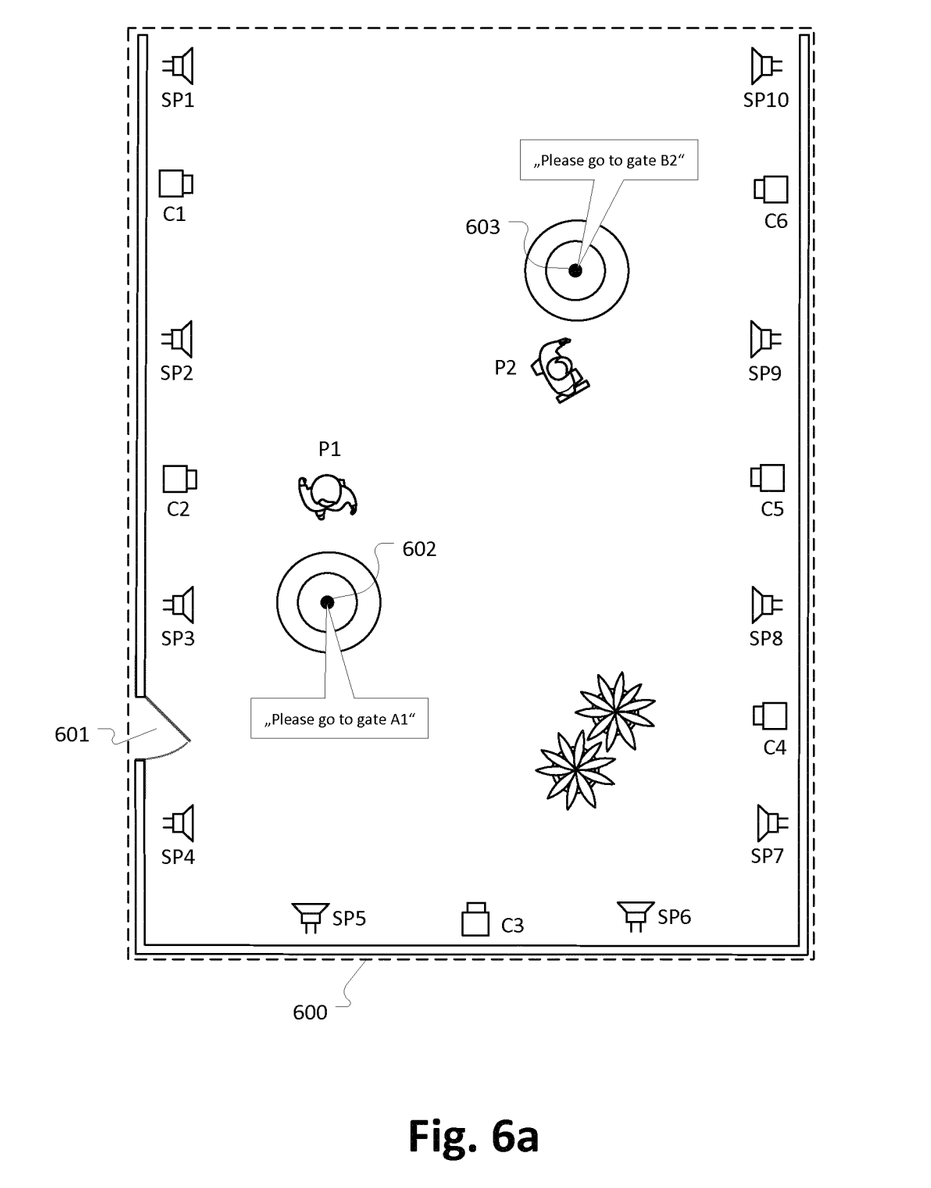
FIG. 6a schematically depicts a public announcement system that generates multiple audio messages at the same time.

FIG. 6*a* schematically depicts a public announcement system that generates multiple audio messages at the same time. As in the embodiment of FIG. 5*a*, a public announcement system comprises a loudspeaker array comprising loudspeakers SP1 to SP10 that are arranged at the walls of a passenger hall 600. In addition, the public announcement system comprises a camera array that comprises cameras C1 to C6 that are arranged at the walls of passenger hall 600. The cameras C1 to C6 produce images of the passenger hall 600. By applying image recognition techniques to the images obtained by cameras C1 to C6, the public announcement system obtains the position of passengers P1 and P2 in passenger hall 600 and by image matching techniques, the public announcement system determines the identity of passengers P1 and P2. Based on the identity information, the public announcement system queries a data base that stores check-in information concerning passengers P1 and P2 in order to obtain the respective gates to which passengers P1 and P2 should go to, here gate A1 for passenger P1 and gate B2 for passenger P2. Close to the position of passenger P1 in passenger hall 600, the public announcement system places a focused sound source 602. This focused sound source 602 generates a first audio message "Please go to gate A1". As the focused sound source 602 is located close to passenger P1, the loudness of the audio message can be adapted in such a manner that the audio message is primarily and clearly audible for passenger P1, but not prominent for passenger P2 who is located far away from the focused sound source 602. Similarly, the public announcement system places a focused sound source 603 close to the position of passenger P2 in passenger hall 600. This focused sound source 603 generates a second audio message "Please go to gate B2". As the focused sound source 603 is located close to passenger P2, the loudness of the audio message can be adapted in such a manner that the audio message is primarily and clearly audible for passenger P2, but not prominent for passenger P1 who is located far away from the focused sound source 603. Passengers P1 and P2 thus receive individual messages that direct them to their respective gates A1 and B2.

According to this embodiment, multiple audio messages at the same time (e.g., with the help of focused sound sources) are used to address a person or a group of persons simultaneously with different messages. As the public announcement system allows conveying several audio messages at the same time, the messages can be individualized for a person or a group of persons. For example, the conveyed message could depend on the person's location. Even more, the audio message could depend on person-specific information, for example, if the public announcement system wants to guide a person in an airport such that he can easily transfer from one gate to another, if the public announcement system knows what his connecting flight is.

The embodiment of FIG. 6*a* which provides multiple messages for multiple focused sound sources may allow to individually address individual persons and/or groups, it may be time efficient as multiple messages can be conveyed at the same time. This may be helpful, e.g., in emergency situations to convey individual information and by this provide different escape routes. Also, such a public announcement system may be helpful, e.g., in a train station where persons may be guided differently to avoid congestion.

Figure 6B:
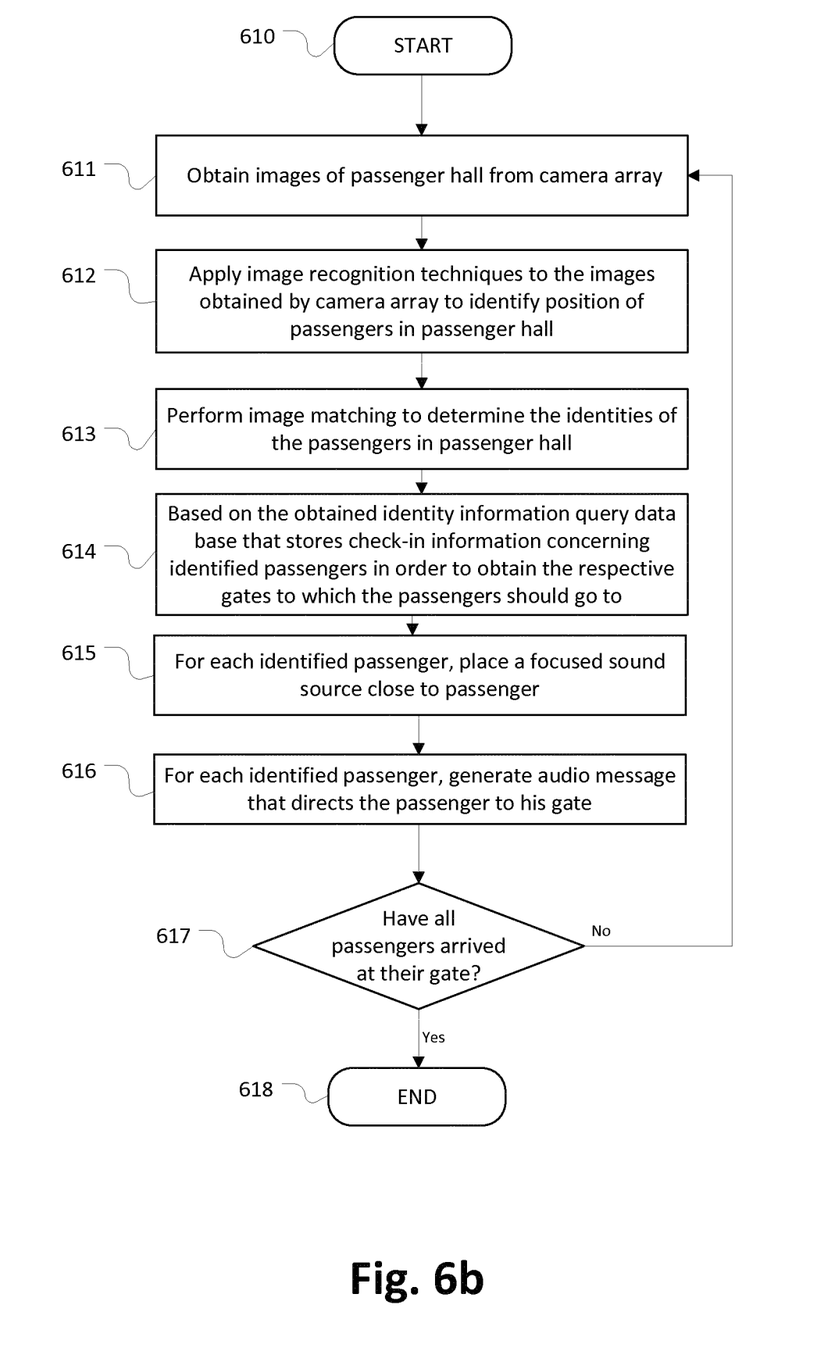
FIG. 6b schematically depicts a process that generates multiple audio messages at the same time.

FIG. 6*b* schematically depicts a process that generates multiple audio messages at the same time. At 610, the process starts. At 611, the images of the passenger hall are obtained from a camera array. At 612, image recognition techniques are applied to the images obtained by the camera array to identify the positions of passengers in the passenger hall. At 613, image matching is performed to determine the identities of the passengers in passenger hall. At 614, based on the obtained identity information, a data base is queried that stores check-in information concerning identified passengers in order to obtain the respective gates to which the passengers should go to. At 615, for each identified passenger, a focused sound source is placed close to the passenger. At 616, for each identified passenger, an audio message is generated that directs the passenger to his gate. At 617, it is tested if all passengers arrived at their respective gates. If yes, at 618, the process ends. If not, the process repeats operations 611 to 617.

System for Digitalized Monopole Synthesis

Figure 7:
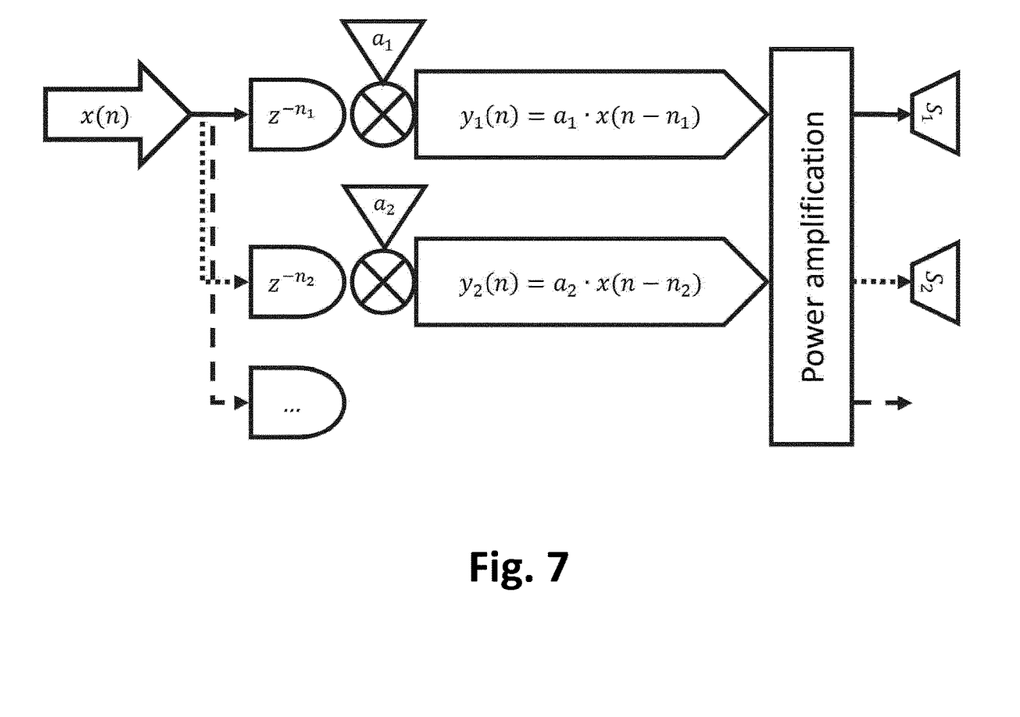
FIG. 7 provides a schematic diagram of a system applying digitalized monopole synthesis algorithm.

FIG. 7 provides an embodiment of a system which implements a method that is based on a digitalized Monopole Synthesis algorithm in the case of integer delays.

The theoretical background of this system is described in more detail in patent application US 2016/0037282 A1 which is herewith incorporated by reference.

The technique which is implemented in the embodiments of US 2016/0037282 A1 is conceptually similar to the Wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

A target sound field is modelled as at least one target monopole placed at a defined target position. In one embodiment, the target sound field is modelled as one single target monopole. In other embodiments, the target sound field is modelled as multiple target monopoles placed at respective defined target positions. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where p=1, . . . , N is the index of the respective synthesis monopole used for synthesizing the target monopole signal. The delay and amplification units according to this embodiment may apply equation (117) to compute the resulting signals $y_p(n)=s_p(n)$ which are used to synthesize the target monopole signal. The resulting signals $s_p(n)$ are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$. For the synthesis of focused sound sources, the delays are inverted (negative value for $n_p$). Since this result in a non-causal system, in practice this is realized by using a buffered solution, where the buffer size is chosen to cover the assumed range of delays necessary to place the source inside of the speakers' area. For example, if the maximum distance from a speaker to the focused source is Rmax, the buffer size should be an integer value $$N_{max} = \frac{Rmax}{c} * f_s,$$

where c is the speed of sound and fs the sampling rate of the system.

Further, according to this embodiment, the amplification factor $$a_p = \frac{\rho c}{R_{p0}},$$

is inversely proportional to the distance $r=R_{p0}$.

In alternative embodiments of the system, the modified amplification factor according to equation (118) of US 2016/0037282 A1 can be used.

In yet alternative embodiments of the system, a mapping factor as described with regard to FIG. 9 of US 2016/0037282 A1 can be used to modify the amplification.

It should be recognized that the embodiments describe methods with an exemplary ordering of method steps. The specific ordering of method steps is, however, given for illustrative purposes only and should not be construed as binding.

It should also be noted that the division of the control or circuitry of FIGS. 1 and 7 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An apparatus comprising circuitry configured to generate one or more focused sound sources as virtual loudspeakers of an announcement system.

(2) The apparatus of (1), wherein the announcement system is a public announcement system.

(3) The apparatus of anyone of (1) or (2), wherein the announcement system is an announcement system for a museum, a railway station, an airport, a passenger hall, or the like.

(4) The apparatus of anyone of (1) to (3), further comprising one or more video cameras that are distributed over a predefined space.

(5) The apparatus of anyone of (1) to (4), wherein the circuitry is configured to use Wavefield synthesis and/or monopole synthesis techniques to generate the focused sound sources.

(6) The apparatus of anyone of (1) to (5), wherein the circuitry is configured to generate a focused sound source that is located at a predefined position of a predefined space.

(7) The apparatus of anyone of (1) to (6), wherein the circuitry is configured to generate one or more audio messages at the focused sound sources.

(8) The apparatus of anyone of (1) to (7), wherein a focused sound source is a sound field that gives the impression that an audio point source is located at a specific position in a predefined space.

(9) The apparatus of anyone of (1) to (8), wherein the circuitry is configured to generate one or more focused sound sources that allow generating audio messages that are spatially confined.

(10) The apparatus of anyone of (1) to (9), wherein the circuitry is configured to generate multiple focused sound sources that are combined to form arbitrarily shaped audio areas.

(11) The apparatus of anyone of (1) to (10), wherein the circuitry is configured to generate a focused sound source that directs a person to a specific position of a predefined space.

(12) The apparatus of anyone of (1) to (11), wherein the circuitry is configured to generate a focused sound source that is located close to an exit.

(13) The apparatus of anyone of (1) to (12), wherein the circuitry is configured to generate passenger-individual focused sound sources.

(14) The apparatus of anyone of (1) to (13), wherein the circuitry is configured to use different sound characters for different passenger-individual focused sound sources.

(15) The apparatus of anyone of (1) to (14), wherein the circuitry is configured to apply image recognition techniques to images obtained by a camera array to obtain the positions of persons in a predefined space.

(16) The apparatus of anyone of (1) to (15), wherein the circuitry is configured to calculate a trajectory that represents the path that a person should take to arrive at a predefined destination.

(17) The apparatus of anyone of (1) to (16), wherein the circuitry is configured to adapt the loudness of an audio message so that the audio message is primarily audible for a specific individual who is located close to a focused sound source, but less audible or substantially inaudible for other persons who are located farther away from the focused sound source.

(18) The apparatus of anyone of (1) to (17), wherein the circuitry is configured to generate for each of a plurality of persons a person focused sound source.

(19) The apparatus of anyone of (1) to (18), wherein the circuitry is configured to generate a focused sound source whose position is changed dynamically following a predefined trajectory in a smooth way.

(20) The apparatus of anyone of (1) to (19), wherein the circuitry is configured to generate a focused sound source that is moving.

(21) The apparatus of anyone of (1) to (20), wherein the circuitry is configured to generate multiple focused sound sources for emitting multiple audio messages at the same time.

(22) The apparatus of anyone of (1) to (21), wherein the circuitry is configured to generate multiple audio messages at the same time that are used to address a person or a group of persons simultaneously with different messages.

(23) The apparatus of anyone of (1) to (22), wherein the circuitry is configured to generate one or more audio messages, each audio message depending on a location of a person, a destination of the person, and/or person-specific information of the person.

(24) A public announcement system comprising the apparatus of anyone of (1) to (23).

(25) A method comprising generating one or more focused sound sources as virtual loudspeakers of an announcement system.

(26) A computer program comprising instructions, the instructions when executed on a processor, causing the processor to generate one or more focused sound sources as virtual loudspeakers of an announcement system.

The invention claimed is:

1. A public announcement system comprising:
   circuitry configured to
   calculate, in real time, a plurality of successive and different trajectories that represent recommended paths for a person to take to arrive at a predefined destination of a predefined space from respective current locations of the person as the person moves within the predefined space,
   generate, in real time, for the predefined space, one or more focused sound sources as virtual loudspeakers of the public announcement system whose position changes dynamically in correspondence with the plurality of trajectories such that the one or more focused sound sources as the virtual loudspeakers are always on the respective trajectories and between the person and the predefined destination of the predefined space until the person reaches the predefined destination, for any orientation and direction of movement of the person in the predefined space, and
   output, in real time, for the predefined space, the one or more focused sound sources as the virtual loudspeakers of the public announcement system,
   wherein the circuitry is remote from the person.

2. The public announcement system of claim 1, further comprising one or more video cameras that are distributed over the predefined space.

3. The public announcement stem of claim 1, wherein the circuitry is configured to use Wavefield synthesis and/or monopole synthesis techniques to generate the one or more focused sound sources.

4. The public announcement system of claim 1, wherein each said focused sound source is a sound field that gives the impression that an audio point source is located at a specific position in the predefined space.

5. The public announcement system of claim 1, wherein the circuitry is configured to generate the one or more focused sound sources that allow generating audio messages that are spatially confined.

6. The public announcement system of claim 1, wherein the circuitry is configured to generate multiple focused sound sources as said one or more focused sound sources that are combined to form arbitrarily shaped audio areas.

7. The public announcement system of claim 1, wherein the circuitry is configured to generate person-individual focused sound sources as said one or more focused sources.

8. The public announcement system of claim 7, wherein the circuitry is configured to use different sound characteristics for different person-individual focused sound sources.

9. The public announcement system of claim 1, wherein the circuitry is configured to apply image recognition techniques to images obtained by a camera array to obtain the position of the person in the predefined space.

10. The public announcement system of claim 1, wherein the circuitry is configured to adapt the loudness of an audio message so that the audio message is primarily audible for the person, but less audible or substantially inaudible for other persons who are located farther away from the one or more focused sound sources.

11. The public announcement system of claim 1, wherein the circuitry is configured to generate for each of a plurality of persons in the predefined space, including said person, a person focused sound source as said one or more focused sound sources.

12. The public announcement system of claim 1, wherein the circuitry is configured to generate multiple focused sound sources for emitting multiple audio messages at the same time.

13. The public announcement system of claim 1, wherein the circuitry is configured to generate multiple audio messages at the same time that are used to address the person or a group of persons including said person simultaneously with different messages.

14. The public announcement system of claim 1, wherein the circuitry is configured to generate one or more audio messages, each said audio message depending on a location of the person, the predefined destination, and/or person-specific information of the person.

15. The public announcement system of claim 1, wherein the generating the one or more focused sound sources as virtual loudspeakers of the public announcement system includes generating, at a same time, for each of a plurality of persons in the predefined space, including said person, a person-focused sound source as said one or more focused sound sources virtual loudspeakers of the public announcement system.

16. The public announcement system of claim 1,
   wherein each of the different trajectories is unknown to the person prior to calculation thereof,
   wherein each of the different trajectories is from the current location of the person to the predefined destination,
   wherein the different trajectories partially overlap with each other, and
   wherein the focused sound sources partially overlap with adjacent focused sound sources for the different trajectories.

17. A method comprising:
   calculating, in real time, using processing circuitry of an announcement system, a plurality of successive and different trajectories that represent recommended paths for a person to take to arrive at a predefined destination of a predefined space from respective current locations of the person as the person moves within the predefined space;
   generating, in real time, using the processing circuitry of the announcement system, for the predefined space, one or more focused sound sources as virtual loudspeakers of the announcement system whose position changes dynamically in correspondence with the plurality of trajectories such that the one or more focused sound sources as the virtual loudspeakers are always on the respective trajectories and between the person and the predefined destination of the predefined space until the person reaches the predefined destination, for any orientation and direction of movement of the person in the predefined space; and outputting, in real time, using the processing circuitry of the announcement system for the predefined space, the one or more focused sound sources as the virtual loudspeakers of the announcement system, wherein the processing circuitry is remote from the person.

18. The method according to claim 17, wherein said generating includes generating, at a same time, for each of a plurality of persons in the predefined space, including said person, a person-focused sound source as said one or more focused sound sources.

19. A non-transitory computer-readable storage medium having stored thereon instructions that, when executed by one or more processors of an announcement system, cause the one or more processors to perform a method comprising:

calculating a plurality of successive and different trajectories that represent recommended paths for a person to take to arrive at a predefined destination of a predefined space from respective current locations of the person as the person moves within the predefined space; and generating for the predefined space one or more focused sound sources as virtual loudspeakers of the announcement system whose position changes dynamically in correspondence with the plurality of trajectories such that the one or more focused sound sources as the virtual loudspeakers are always on the respective trajectories and between the person and the predefined destination of the predefined space until the person reaches the predefined destination, for any orientation and direction of movement of the person in the predefined space, wherein said generating includes generating, at a same time, for each of a plurality of persons in the predefined space, including said person, a person-focused sound source as said one or more focused sound sources, and wherein the one or more processors of the announcement system are remote from the plurality of persons.

* * * * *